United States Patent [19]

Bogatzki

[11] 4,227,606
[45] Oct. 14, 1980

[54] APPARATUS FOR SPACING ARTICLES MOVING IN A LINE

[76] Inventor: Hans U. Bogatzki, Ferdinand-Hodler-Strasse 24, Zurich, Switzerland

[21] Appl. No.: 15,788

[22] Filed: Feb. 27, 1979

Related U.S. Application Data

[63] Continuation-in-part of Ser. No. 862,439, Dec. 20, 1977, abandoned.

[51] Int. Cl.³ ............................................. B65G 47/28
[52] U.S. Cl. ...................................... 198/459; 198/792
[58] Field of Search ........................ 198/459, 461, 792

[56] References Cited

U.S. PATENT DOCUMENTS

| | | | |
|---|---|---|---|
| 3,190,434 | 6/1965 | Dardaine | 198/425 |
| 3,292,769 | 12/1966 | Zuppiger | 198/792 |
| 3,294,215 | 12/1966 | Walter | 198/792 X |
| 3,333,676 | 8/1967 | Sherman | 198/425 |
| 3,845,852 | 11/1974 | Langen et al. | 198/461 X |
| 3,929,220 | 12/1975 | Powel | 198/732 |

FOREIGN PATENT DOCUMENTS 1232068  1/1967  Fed. Rep. of Germany ........... 198/792

Primary Examiner—Jeffrey V. Nase
Attorney, Agent, or Firm—Frishauf, Holtz, Goodman & Woodward

[57] ABSTRACT

The apparatus includes two partially parallel endless rail and trolley systems. The first rail and trolley system guides spacing members so that they approach the moving articles and move along their direction for a distance sufficient to space them. The spacing members are interconnected by articulated connecting arms, which pivot at the spacing members and also at an intermediate pivot point. The intermediate pivot points are guided along the second rail system. Adjustment of the path of the second rail and trolley system relative to the first rail and trolley system where the spacing members operate on the articles permits the adjustment of the spacing operation performed by the spacing members.

13 Claims, 9 Drawing Figures

APPARATUS FOR SPACING ARTICLES MOVING IN A LINE

This application is a Continuation-in-Part of my application Ser. No. 862,439, filed Dec. 20, 1977, (claiming priority of Swiss application 16'311/76 of December, 1976) now abandoned.

The present invention relates generally to apparatus for producing uniform gaps between mass-produced individual articles conveyed in a line on a conveyor belt or the like to at least one further processing station. It relates particularly, but not exclusively, to separating means of such apparatus which are adjustable parallel to the direction of movement of the articles of the line on the conveyor belt and which engage the articles.

BACKGROUND AND PRIOR ART

In the manufacturing and processing of mass-produced articles in the consumer goods industry, there is generally used a plurality of processing systems and/or machines in series. The individual articles, such as glasses, bottles, cans, boxes, etc., move from one processing station to the next on conveyor belts. On such conveyor belts, the articles are generally already separated and stand one behind the other, but their spacing is extremely non-uniform. This non-uniform spacing is prejudicial to the requirement that the articles be supplied synchronously to the further processing station, that is to say with an identical spacing, because production sequences or treatment processes in the individual machines are usually accomplished during uniform time cycles which translate into uniform cyclic spacing distances along the moving line. Therefore, the articles must be supplied individually in accordance with the required cyclic spacing, which, of course, must be greater than the article diameter along the line. The transfer to and from the conveyor belts or machine mechanisms causes serious problems arising from different article shapes and different processing speeds, which problems make the complete production sequence more fault-prone.

In order to at least partly control these problems, it is common to use an apparatus of the above-described type with a feed screw as an essential component. The articles are taken up by this feed screw, are separated by the increasing spacing course, and then transferred at uniform time intervals to the production machine. In spite of the fact that this system is used in almost all production processes, it cannot be considered ideal.

As the screw takes up the article and transports it, the point of engagement of the article must be very precisely determined, particularly with tall and small diameter articles, so that the article is not overturned. This is particularly the case at high speeds and when articles arrive singly. The reason for this is that due to the special characteristics of the screw design, an article which is supplied in an irregular manner can be struck in such a way by the beginning thread of the screw helix that the article is jerked abruptly which in the case of high, small diameter products generally leads to wobbling, overturning, and consequent interruption of the entire production sequence. In the case of flat, large diameter articles, a screw cannot be used, because the large screw diameter required for handling the articles exceeds the article height, so that the screw rotation axis would be located above the product height. Articles with complicated configurations can often not be gripped at the ideal contact point by the screw. This can lead to a passing under or knocking down of the article. Furthermore, when a feed screw is dirty or worn, the constant abrasion of the articles by it can lead to scratches or damage to the articles. This applies particularly in the case of labelled or bright objects. In the case of thin or elastic articles which are not supplied in a regular manner, deformation or damage can be caused by the advancing start of the screw. It is also disadvantageous that at high production speeds the advancing first thread of the feed screw momentarily acts as a barrier, so that individually fed-in articles cannot be picked up, and it is only after the build up of a so-called backlog or a dynamic pressure that the articles can be taken up by the screw. Since, as stated, this problem occurs particularly at high production speeds, each article strikes a stationary column of articles at high speed. This is particularly disadvantageous in glassworks, due to the danger of breakage. Experience in glassworks has shown that all forms of impacts, scratches, etc. occurring just after manufacture reduce the strength of the glasses to a considerable extent. Finally, it is disadvantageous that different screws have to be fitted for different diameters and heights of the articles handled.

It is also known to separate and to synchronously transfer individual articles by means of a feed star. However, even this relatively much-used system has significant disadvantages. For example, the distribution of small-diameter articles over large distances is not possible. In addition, at high speed the star ends act as a wall and lead to the overturning of individually arriving articles, or even to a jamming of them between the star and facing guide wall.

It has also been proposed to separate articles by means of belts moving at a higher speed than the conveyor belt and which thus spread the articles apart. However, this system has the disadvantage that non-uniform spacings of the fed articles still remain non-uniform.

THE INVENTION

It is an object to provide an apparatus for producing identical spacings between mass produced articles moved on a conveyor belt which makes it possible to space a moving line of individual articles of all shapes and types at hitherto unachieved production speeds either towards or away from the direction of movement of the conveyor belt and with identical reciprocal spacings as desired for the working cycle of a further processing station.

Accordingly, there is provided a separating means including a plurality of article spacing members movable in a direction parallel to the conveying path of the articles and intended for the instantaneous engagement of one article in each case. The spacing members are supported by guidance means on an endless first rail system which returns them to their starting point, the latter being interconnected by means of a motor-driven rotary articulated member chain system whose articulated connecting arm members are alternately connected in articulated manner. In each case, there is one articulated arm member with one spacing member between it and the adjacent spacing member. At the articulated pivot point between adjacent spacing members, the articulated members are supported on a second rail system whose course differs from the first rail system.

As a result of these measures, it is now possible to vary as desired the spacings between the individual spacing members, and consequently between the articles operated on by the spacing members between the inlet and the outlet of the apparatus, as a function of the relative course of the first and second rail systems located between these two points. This is naturally a function of the length of the articulated connecting arms. In addition, an increased spacing between the spacing members at the inlet can be obtained if the rail system of this point coincides with the reversal point of the spacing members. Such an arrangement leads to a reduction of problems in feeding-in of the articles.

In order to further improve the variability, the arrangement can be such that the first and second rail systems are adjustable relative to one another in their guidance planes. This can be achieved by the second rail system being adjustable in its guidance plane and/or through the second rail system being at least partly interchangeable for varying its course.

As a result of these measures, it would be possible, if desired, to slow down the spacing members to zero speed and then accelerate them again with practically any desired acceleration mode.

This permits a simple and rapid changeover of the apparatus to virtually all possible articles. To this end, it is advantageous for the spacing members to carry interchangeable spacing heads.

Tests with such an apparatus have shown that articles, and in particular bottles, can now be processed at a production rate of about 1,000 items per minute and above with virtually no backlog, whereas hitherto only 100 items per minute could be so processed.

BRIEF DESCRIPTION OF THE DRAWINGS

FIG. 4 is a diagrammatic view of a fragment of an apparatus in accordance with the invention and so designed that its individual spacing members come to a momentary halt as they pass by;

DESCRIPTION OF THE PREFERRED EMBODIMENTS

Figure 1:
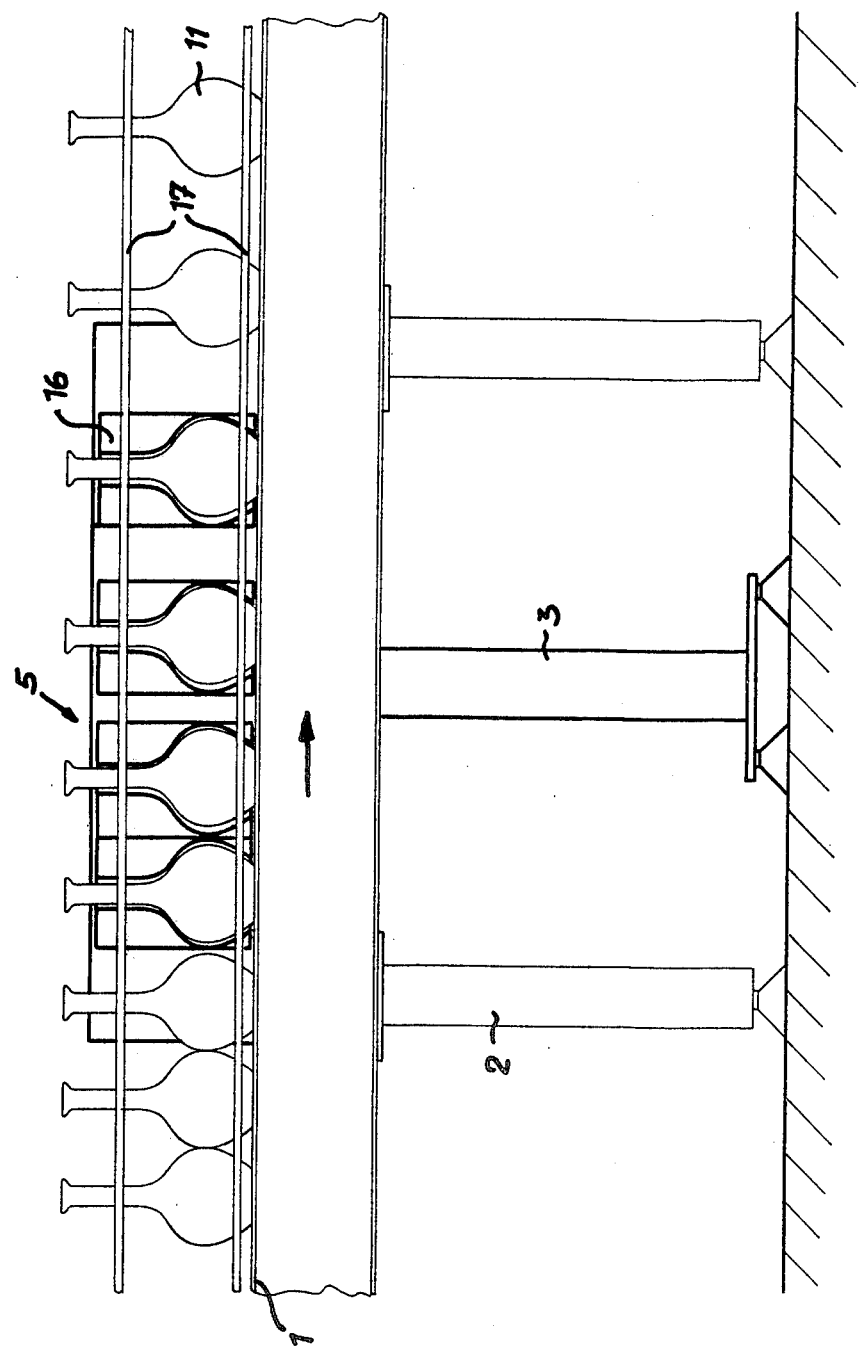
FIG. 1 is a side view of an apparatus according to a preferred embodiment of the invention with a conveyor belt.

The drawings show an apparatus for producing identical spacings between bottles 11 conveyed on a conveyor belt 1. Conveyor belt 1 rests on a conventional frame 2 and can be driven in a known and not shown manner. The articles, in this case bottles 11, which can for example be arriving directly from a glass bottle mold, are generally individually placed in a known manner on the conveyor belt 1, which generally maintains a constant conveying speed. The bottles 11 follow one another in a close row or with widely varying spacings and pass over a predetermined conveying zone to a further processing station not shown.

Since it is desired that such further processing stations, such as measuring, coding, sealing, labelling and similar stations operate at high speed, the articles, i.e. in this case bottles, must naturally be supplied at a corresponding speed and with a corresponding appropriately matched uniform spacing, i.e. synchronously. This is brought about in accordance with the present invention by the apparatus 5 which is associated with the conveyor belt 1 at a desired location.

The apparatus 5 comprises a machine frame 3 and a plurality of spacing members 12, each of which serves to instantaneously engage one bottle 11. Spacing members 12 are supported by means of guidance means in the form of rollers 13 (FIG. 3) on an elongated endless rail system 15, whose course can be seen from FIG. 2. It has a generally straight section adjacent belt 1, and two turn-around loops at the ends. The individual spacing members 12 form a trolley with interchangeable spacing heads 16 suitably connected to spacing members 12 which are advantageously adapted to the shape of the articles 11 conveyed, as shown in detail in FIG. 3. Preferably, the connection is pivotable, and/or yielding to form a floating attachment for self-alignment with articles 11. The devices 16 cooperate with an opposite rail 17 which engages the other side of the bottle 11.

Figure 2:
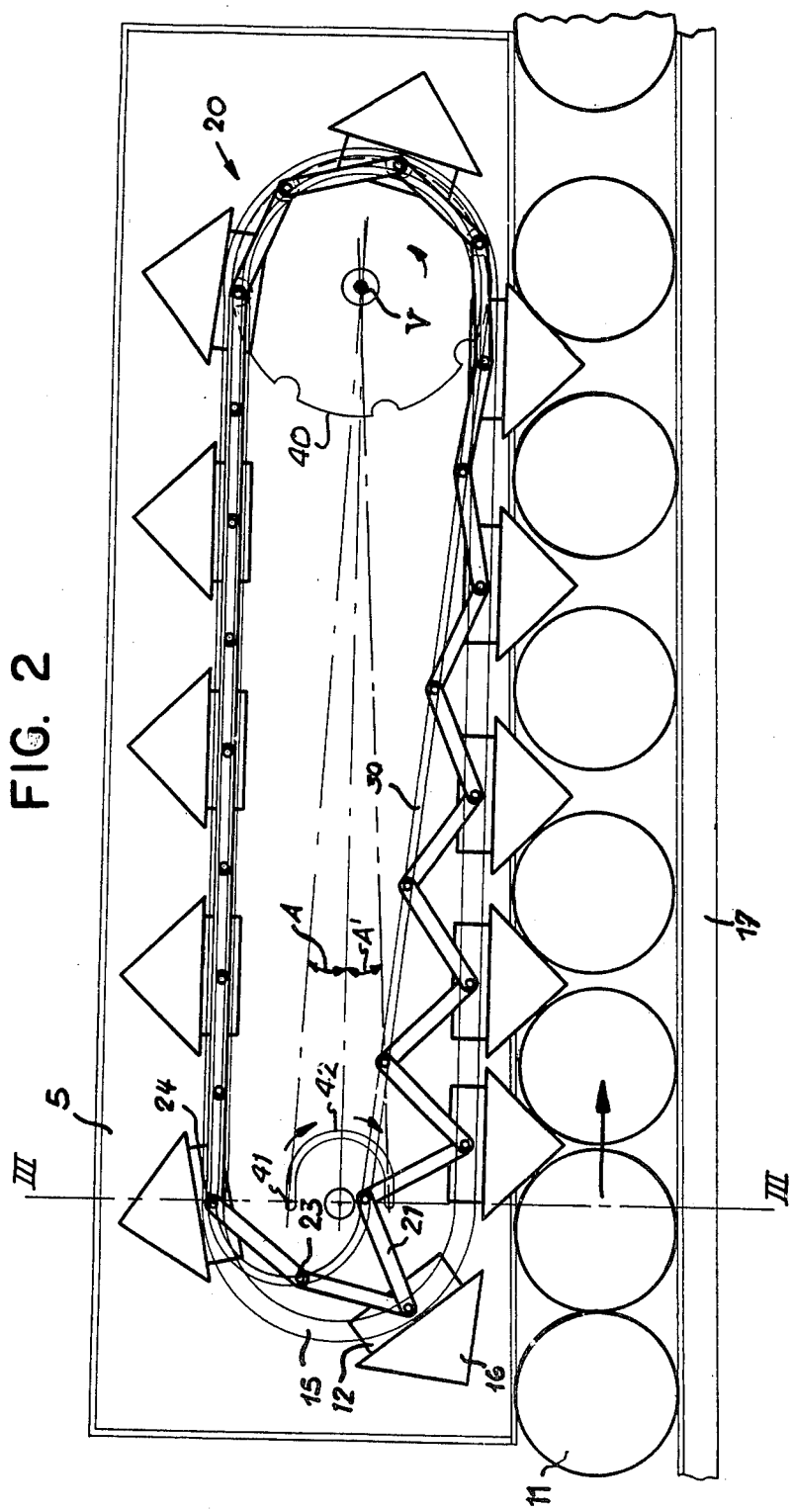
FIG. 2 is a plan view of the apparatus of FIG. 1.

As can be seen particularly from FIGS. 1 and 2, the trolleys 12 are here moved from left to right in a direction generally parallel to conveyor belt 1 conveying direction in a track or a rail system 15. The rail system 15 includes two parallel straight track sections which are interconnected by curved sections. The curved sections are located in the inlet and/or outlet of the arrangement. Thus, this first rail system 15 is symmetrical.

It is pointed out that the spacing members 12, which are in this case constructed as trolleys, can also be curved sides or slides guided over blocks, in which case the rail system must be constructed accordingly.

The attachment of the rail system to the machine frame 3 can also be effected in any practicable manner and requires no further explanation here. It is also clear that it is desireable to firmly fix the apparatus 5 to the selected location on the conveyor belt or its frame 2.

Figure 3:
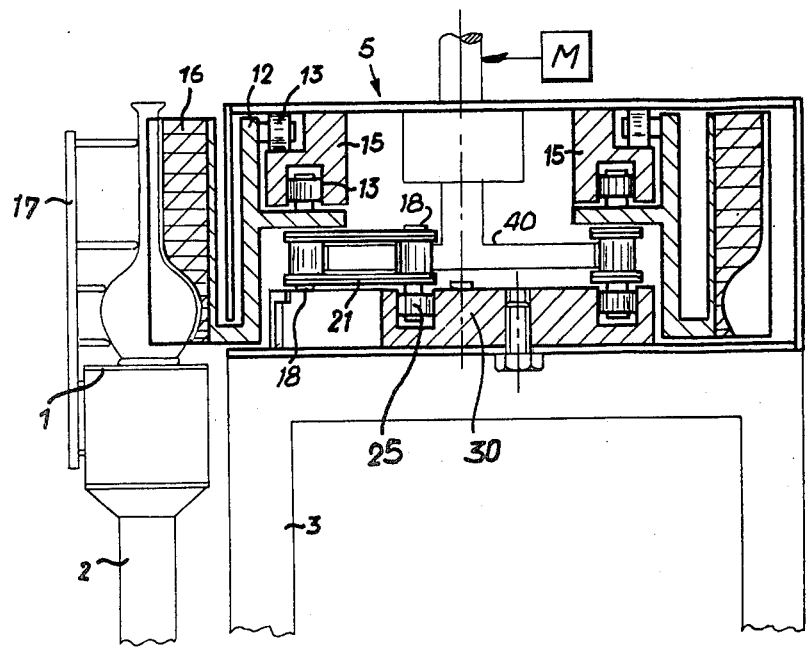
FIG. 3 is a cross-section through the apparatus of FIGS. 1 and 2.

The individual trolleys 12 are interconnected by a rotary articulated member system 20, which can be in the form of a hollow bolt chain. System 20 has articulated members 21 (FIG. 2) which are alternately connected in articulated manner at point 24 with a trolley 12, at a point 23 between two adjacent trolleys 12 and there further connected with an adjacent articulated member 21. The joints at points 23, 24 are hereby formed by means of suitable pivots 18, as shown in FIG. 3. At the articulated pivot points 23 between two adjacent trolleys 12, articulated members 21 are also supported by means of rollers 25 (FIG. 3) in an elongated endless second rail system 30 whose course diverges from the first system.

According to FIG. 2, the return track of the second rail system 30 is parallel to the return track section of the first rail system 15. The forward movement track section approaches the forward movement track section of the first rail system 15 at an angle and is closest to rail system 15 in the outlet area. As a result, with a continuous drive 40, e.g. a sprocket at one end, the individual trolleys in the system assume different relative speeds and respective spacings, depending on the angular position of the associated articulated members 21.

By suitable shaping of the respective rail systems 15, 30, a very large regulating range can be obtained for the relative speeds and spacings provided by the apparatus.

Figure 4:
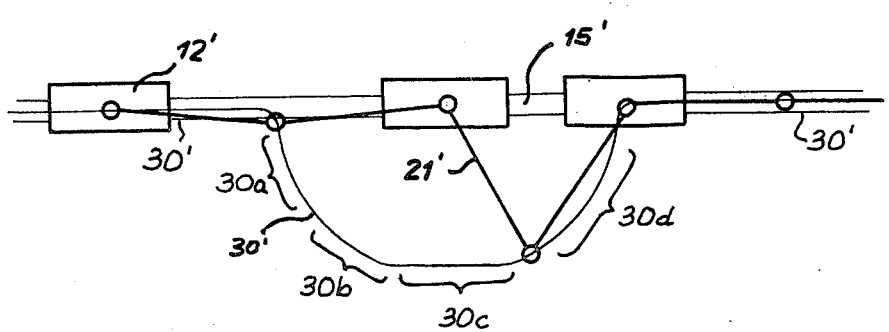

In principle, it is firstly possible to adjust the first rail system 15 and the second rail system 30 in their guidance planes relative to one another. Advantageously, the second rail system 30 carrying the articulated members 21 is made adjustable in its guidance plane. For example, FIG. 2 shows an angular range A, A' by means of which an adjustment can be carried out around the displacement point V which varies the spacing and speed of the incoming trolley. In addition, rail system 30 can comprise interchangeable sections 30a–30d (FIG. 4) in order to obtain any desired guidance path. FIG. 4 also shows a path 30', which makes it possible to instantaneously stop trolley 12' on its rail 15', in the general manner explained above.

Figure 2A:
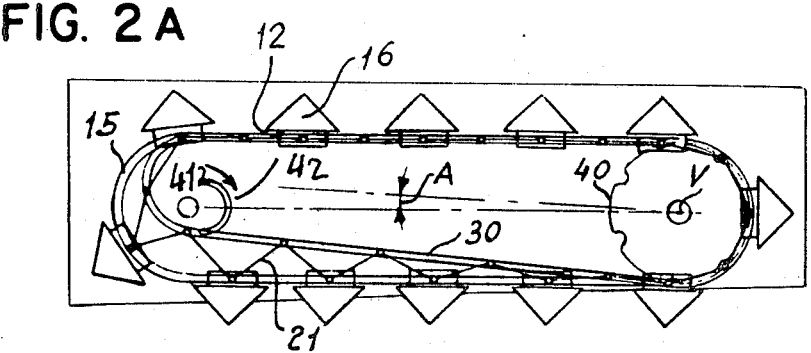
FIGS. 2a, 2b and 2c are plan views of the apparatus of FIG. 1 which illustrate different adjustment positions.
Figure 2B:
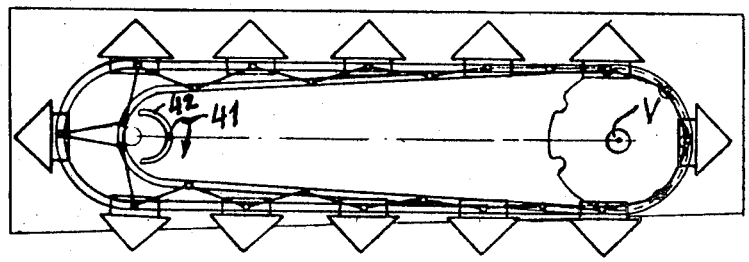
Figure 2C:
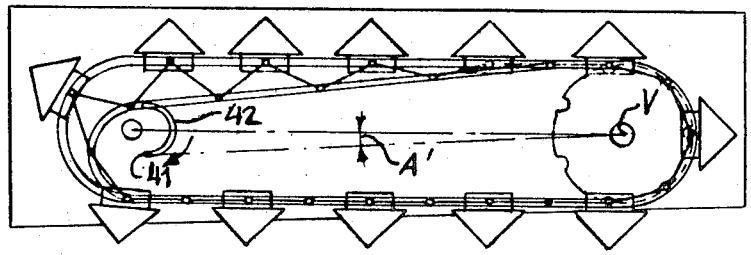

FIGS. 2a to 2c show various positions of track system 30 (FIG. 5b) with respect to the track system 15. The track system 30 preferably is an integral element pivotable about a pivot point V which is coaxial with the drive sprocket wheel 40. Drive sprocket wheel 40, itself, is driven by a motor M. The unit 30 can be controlled by engagement of a pivot pin 41 (FIG. 5b), having a pivot axis 41' (FIG. 5a) in a curved adjustment track section 42 formed or secured to the frame of the apparatus beneath the rail unit 30. FIG. 2a shows engagement of the pin 41 at the topmost end of adjustment rail 42, which places the deflection of the unit 30 at the uppermost position, that is, with angle A. In the position shown in FIG. 2b, the pin 41—which may be movable longitudinally in the track section 30—is in the center position of the track section 42 and the angle A is zero. FIG. 2c illustrates the position with the pin 41 at the lowermost end of the guide track 42, the angle A' now is negative with respect to angle A (FIG. 2a). Thus, a single track section of the general guidance path outline as seen in FIG. 5b can be used to obtain a plurality of spacing distances, and hence movement characteristics, thus providing a versatile apparatus which can be easily matched to requirement of the specific articles to be transported.

Figure 5A:
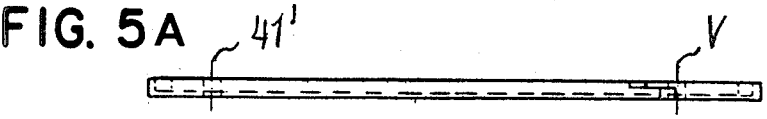
FIGS. 5a and 5b are a side view and a top view, respectively, of the second rail system.
Figure 5B:
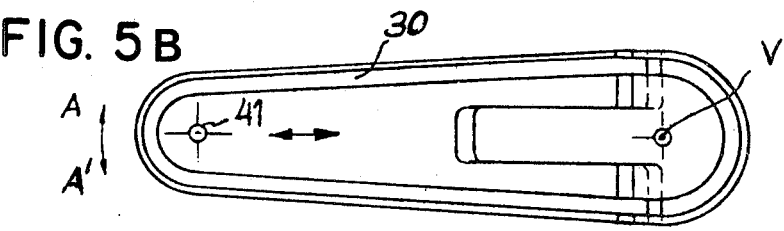

The second rail system can be a unitary element, that is, a unitary constructional track arrangement which, as shown in FIG. 5a, is built in form of a plate-like or frame element with a track 30 therearound, as seen in FIG. 5b, the unitary element being a separate unit which can be replaced as a separate element in the entire apparatus to vary the track length and track spacing and, upon proper placement of the pin 41, its relative adjustment position. The track 30 can, however, also be constructed in sections or parts, with parts and sections interchangeable. A portion of the interchangeable zone is shown in FIG. 4 at 30a, 30b . . . 30d so that the speed-distance relationship of the individual spacing members 12' or trolleys can be individually matched to the size of the articles and the transport requirements of the overall system.

I claim:

1. Apparatus for uniformly spacing from each other articles (11) in a moving line (1) of such articles for facilitating processing of the articles at a processing station, the apparatus comprising:
    a first elongated, endless rail system (15) having a first rail system section adjacent the article line (1) and running along generally parallel to the direction of movement of the line,
    a plurality of article spacing members (16) guided along the first rail system,
    articulated connecting arms (21) interconnecting the article spacing members, the connecting arms pivoting at each spacing member (16) and at an intermediate pivot point (23) between the spacing members,
    a second elongated, endless rail system (30, 30') having a second rail system section adjacent the first rail system section and non-parallel to the first rail system section, the first and second rail systems (15, 30) being adjustable relative to one another in their guidance plane, and including turn-around loop sections at their respective ends;
    pivot guide means (25) for guiding the intermediate pivot points of the articulated connecting arms along the second rail system section;
    drive means (40) for driving the article spacing members (16) along the first rail system section and engaging said article spacing members adjacent one turn-around loop of the first endless rail system;
    and wherein said second rail system (30, 30') comprises a unitary structural element defining an elongated endless pivot guide means closed by end loops, each end loop having a center point (V, 41'), the diameter of the pivot guide means at the region of the end loops of the elongated endless guide means being different, the center point of one of said end loops being pivotably connected to said unitary structure, and fixed with respect to said first rail system (15), the center point of the other of said end loops being movable and shiftable with respect to said first rail system to permit selective positioning of the second rail system with respect to the first rail system.

2. The apparatus defined in claim 1, wherein the orientation of the first rail system is fixed and the orientation of the second rail system section with respect to the first rail system section is adjustable.

3. The apparatus defined in claim 1, wherein the pivot guide means are rollers (25) located at the intermediate pivot points and engaged in said second rail system (30).

4. The apparatus defined in claim 3, wherein the articulated connecting arms are connecting members of a hollow-bolt chain system.

5. The apparatus defined in claim 4, wherein the spacing members are guided along the first rail system by rollers.

6. The apparatus defined in claim 1, wherein the direction of movement of the articles in the line, the first rail system section, and the second rail system section are all substantially in the same plane.

7. The apparatus defined in claim 6, wherein the first rail system section is angled so that it approaches the moving line of articles in the direction of movement of the articles.

8. The apparatus defined in claim 1, wherein the second rail system (30, 30') comprises a unitary replaceable unit.

9. An apparatus according to claim 1, wherein the article spacing members are trolleys.

10. An apparatus according to claim 1, wherein the article spacing members carry interchangeable distributing or driving devices (16).

11. An apparatus according to claim 1, wherein the second rail system (30') is constructed at least partly in interchangeable manner (30a–d) to permit modification of its course.

12. The apparatus according to claim 1, wherein the diameter of the pivot guide means (30, 30') at the end loops are different, and the movable center point is at the position of the smaller one of said diameters.

13. The apparatus according to claim 12, further comprising a positioning track (42), and means (41) in engagement with said positioning track and with the second rail system (30, 30') to guide and define the shifting movement of the shiftable center point (41') of the second rail system (30, 30').

* * * * *